United States Patent [19]

Hirst, Jr. et al.

[11] 3,973,793

[45] Aug. 10, 1976

[54] LOCKING MECHANISM INCLUDING A LOCKING PIN

[75] Inventors: Charles M. Hirst, Jr.; Eugene C. Lipshield, both of Moberly, Mo.

[73] Assignee: Orscheln Brake Lever Mfg. Company, Moberly, Mo.

[22] Filed: Sept. 30, 1974

[21] Appl. No.: 511,023

[52] U.S. Cl. ............................... 292/144; 292/302
[51] Int. Cl.² ........................................... E05C 1/06
[58] Field of Search ........... 292/144, 302; 296/35 R; 180/89 A, 89 R

[56] References Cited
UNITED STATES PATENTS

| | | | |
|---|---|---|---|
| 2,815,796 | 12/1957 | Lobanoff | 292/144 X |
| 3,624,761 | 11/1971 | Kohn | 292/144 X |
| 3,638,983 | 2/1972 | Flournoy | 292/302 |
| 3,797,882 | 3/1974 | Brimhall | 180/89 A X |

FOREIGN PATENTS OR APPLICATIONS

| | | | |
|---|---|---|---|
| 462,068 | 3/1937 | United Kingdom | 292/302 |

Primary Examiner—Robert L. Wolfe
Attorney, Agent, or Firm—Lawrence E. Laubscher

[57] ABSTRACT

Improved heavy duty locking means are disclosed for locking together a pair of movable components such as the tilt cab and chassis components of a motor vehicle, characterized by the provision of movable locking pin means for releasably connecting the blade and housing members secured to adjacent surfaces of the components, respectively. In one embodiment, the locking pin is connected with the housing member for axial displacement between locked and released positions relative to a locking aperture contained in one end of the blade member. In another embodiment, the locking pin is connected for lateral displacement relative to a locking slot contained in a lateral surface of the blade member. The locking pin may be actuated by piston and cylinder motor means or by a manually-operable linearly-displaceable actuator. In various embodiments of the apparatus, the motor means and the locking pin are arranged on the same and on opposite sides of the blade and housing members, respectively. In each of the embodiments, the locking pin is spring-biased toward the locked position relative to the locking opening contained in the blade member.

3 Claims, 27 Drawing Figures

LOCKING MECHANISM INCLUDING A LOCKING PIN

BACKGROUND OF THE INVENTION

In the prior U.S. Pat. No. 3,279,559 of C. M. Hirst, Jr. issued Oct. 18, 1966, there is disclosed a cushioning and locking mechanism for tilt cab vehicles including bell crank cam means for initially displacing a hook member axially from a locked position relative to a fixed locking pin to a safety position spaced from the pin, and for subsequently pivoting the locking member to a fully released position relative to the pin. In another prior U.S. Pat. No. 3,497,257, of the same inventor entitled "Tilt Cab Lock Actuator" issued Feb. 24, 1970, an improved locking system is disclosed that is operable hydraulically by piston-cylinder motor means, thus permitting remote control operation of the tilt cab locking means. One drawback of the above mentioned devices was that the hook member could move to the fully locked position without engaging the locking pin, particularly when the vehicle was on uneven ground, thereby preventing the locking components from being properly seated.

In another U.S. Pat. No. 3,581,840 issued June 1, 1971 to C. M. Hirst, Jr. and Eugene C. Lipshield, there is disclosed a tilt cab lock actuator including provisions which prevent the hook member from moving to the fully locked position without first engaging the locking pin when the locking components are in a jammed condition. Although the latter invention functions quite well, it consists of a large number of parts which are quite costly, as well as difficult to assemble. In each of the previously mentioned inventions, the lock assembly includes a movable hook which engages a stationary locking pin.

The present invention was developed to provide an improved locking mechanism which avoids the above and other drawbacks and which is less costly to produce and consists of a reduced number of parts that are readily assembled.

SUMMARY OF THE INVENTION

The present invention relates to an improved heavy duty locking apparatus for locking together a pair of movable components, including movable locking pin means which are carried by a pin housing connected with one component for engagement with a locking opening contained in one end of a blade member that is connected at its other end with the other component. In one embodiment, the locking pin is axially displaceable between locked and released positions relative to a locking aperture contained in the blade member. In another embodiment, the locking pin is laterally displaceable relative to a locking slot contained in the blade member. The locking pin is normally spring-biased toward the locked position, actuator means of the piston-cylinder motor or manually operable type being provided for displacing the locking pin toward its released position. The invention has utility in such applications as the locking together of the cab and chassis components of a tilt cab vehicle as tailgate locking means, vehicle aerial bucket locking means, boom holddown means for a vehicle in transit, antirotation means for crane and scraper blade turntables, a tilt bed lock for tilt bed truck and trailer beds, a latch for attaching implements to a tractor, and a power unlatching and locking means for a typical pintel hook.

OBJECTS OF THE INVENTION

Accordingly, the primary object of the present invention is to provide locking means for locking together a pair of components, including a blade member adapted for connection at one end with one of the components, a pin housing member adapted for connection with the other of the components, and a locking pin connected with the housing for movement between locked and released positions relative to a locking opening contained in the other end of the blade member. The locking pin may be connected for axial displacement relative to a locking aperture contained in the blade member, or for lateral displacement relative to a corresponding locking slot contained in a lateral surface of the blade member.

In accordance with a more specific object of the invention, the pin housing is bifurcated to define a pair of legs between which the blade member is seated when the components are in an adjacent position. The locking pin is axially spring-biased toward a locked position in which the locking pin extends through aligned locking openings contained in the leg portions of the pin housing, and a locking aperture contained in the blade member arranged therebetween. In one embodiment, the adjacent surfaces of the leg portions are downwardly convergent, the lateral surfaces of the blade member being correspondingly tapered. In another embodiment, the adjacent surfaces of the leg portions and the corresponding lateral surfaces of the blade member are parallel.

According to a further object of the invention, the pin member and the locking aperture are correspondingly tapered, the blade and housing members being provided with projection and slot orientation means which assure proper orientation between the blade and pin members.

A more specific object of the invention is to provide locking apparatus of the type described above including actuator means of the piston and cylinder motor type for displacing the locking pin toward the released position against the force of spring means that bias the locking pin toward the locked position. In one form of the invention, the motor means and the locking pin are arranged on the same side of the blade and housing members, and in another form, the pin and motor means are arranged on opposite sides of the blade and housing members. In one embodiment of the latter form of the invention, the pin is axially arranged on a transverse support bar which is supported by a pair of parallel longitudinal rods which are slidably mounted in corresponding bores contained in the housing member. The actuator means may include a single piston and cylinder motor that is connected with the longitudinal rods by a transverse support, or a pair of piston and cylinder motors connected with the ends of the longitudinal rods, respectively. In another embodiment, the actuator means include an axially shiftable clevis that carries a locking pin which is laterally displaceable relative to a locking slot contained in an end surface of the blade member. In a further form of the invention, the housing member and the motor means are connected on opposite sides of a plate portion of the chassis, pivotally mounted bell crank means being mounted in an opening contained in the plate portion for connecting the motor means with the locking pin. The bell crank includes an arm portion having a surface which is adapted to engage the lowermost surface of the blade member to assist in lifting the same from its seated position relative to the housing member.

According to another object of the invention, the locking aperture is vertically spaced from the lower extremity of the blade member, whereby the lower portion of the blade member serves as a jam-responsive means for preventing shifting of the locking pin toward its locked position when the blade member is incompletely seated on the housing member.

In accordance with a further object of the invention, the actuator means includes a manually- of mechanically-operable linearly displaceable member for displacing the locking pin axially against the biasing force of spring means that normally bias the locking pin toward its locked position. In one embodiment, the linearly displaceable member comprises a rod connected with the locking pin, and in another embodiment, the linearly displaceable member comprises the inner strand member of a coaxial cable the outer sheath portion of which is rigidly connected with the housing by a cover member.

DESCRIPTION OF THE DRAWING

Other objects and advantages of the invention will become apparent from a study of the following specification when viewed in the light of the accompanying drawing, in which.

Figure 1:
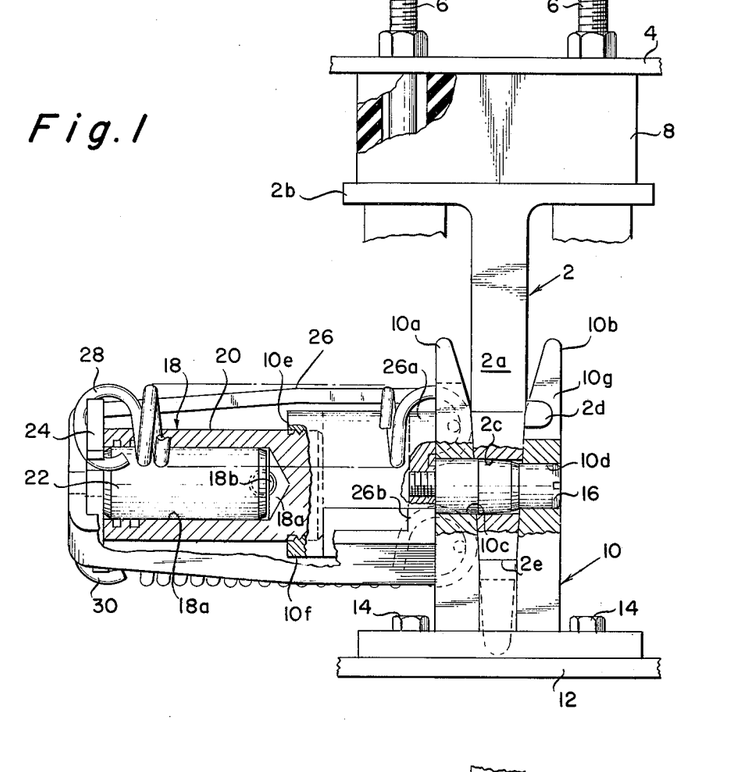
FIG. 1 is a sectional view illustrating a first embodiment of the tilt cab lock assembly in the locked condition.
Figures 2, 2A:
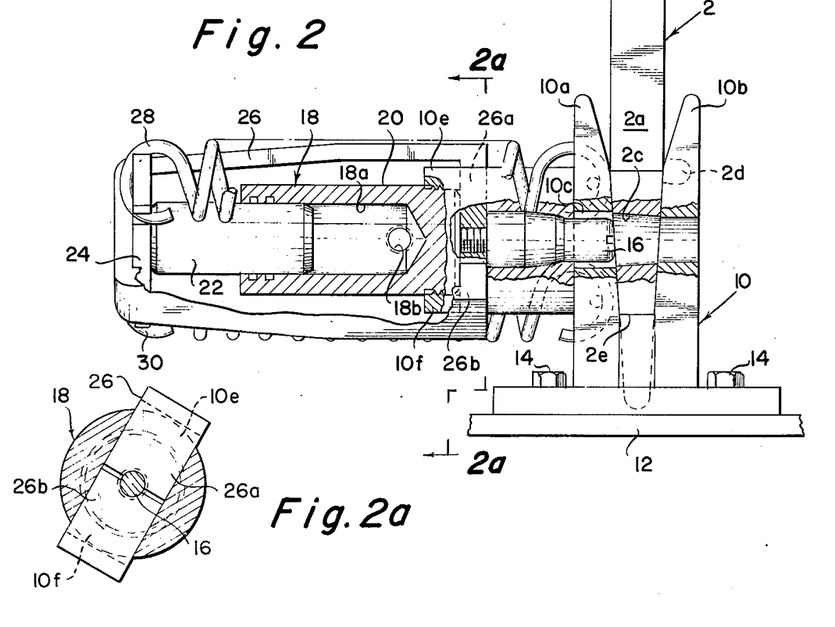
FIG. 2 is a corresponding sectional view of the lock assembly of FIG. 1 in the released condition.
FIG. 2a is a sectional view taken along line 2—2 of FIG. 2.
Figure 3:
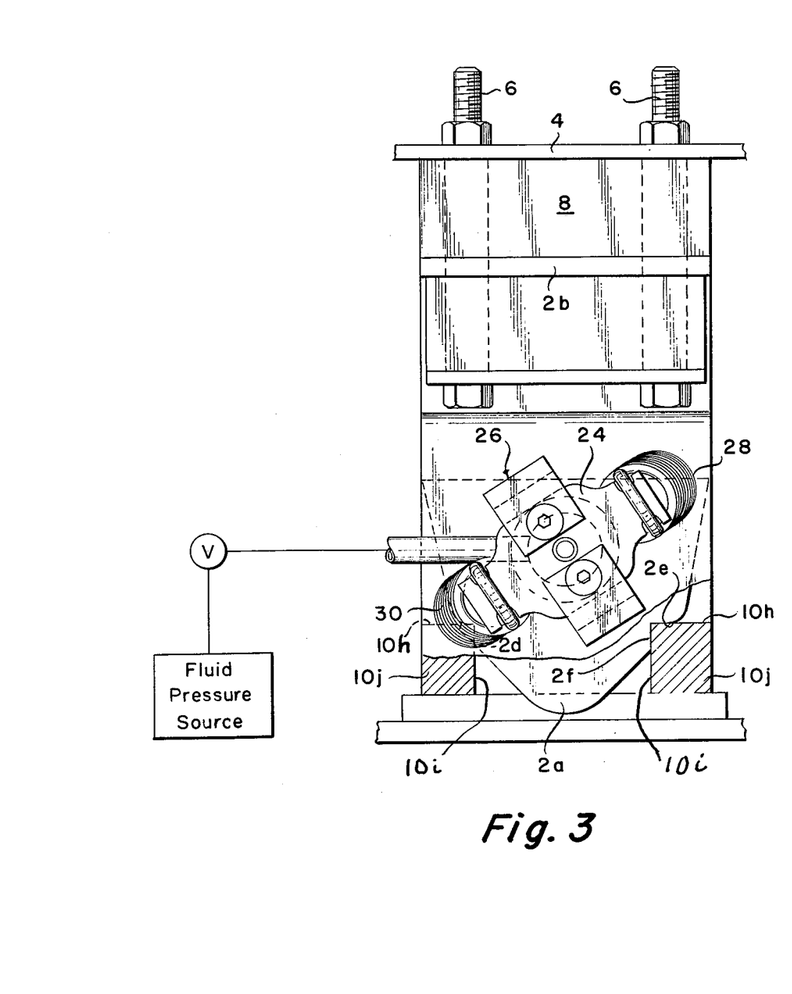
FIG. 3 is a side elevation of the lock assembly of FIG. 1.

Referring first more particularly to FIGS. 1–3, the tilt cab lock assembly of the present invention includes a generally T-shaped blade member 2 having a depending portion 2a and a horizontal upper portion 2b which is adapted for connection with the bottom portion of the tilt cab 4 by means of bolts 6 and resilient cushioning means 8 which is compressed between the blade member and the tilt cab body. As shown in FIGS. 1 and 2, the depending blade portion 2a is arranged to extend—when the tilt cab is in its normal lowered position—between the upperly extending legs 10a and 10b of a housing member 10. The depending blade portion contains a locking aperture 2c which is aligned with corresponding openings 10c, 10d contained in the legs 10a and 10b of the housing member 10. The housing member 10 is adapted to be bolted to the chassis frame 12 by bolts 14. Mounted for axial displacement between locked (FIG. 1) and released (FIG. 2) positions relative to the blade locking aperture 2c and the housing opening 10d is a locking pin 16 which is operable by piston and cylinder motor means 18. More particularly, the motor means 18 includes a cylinder 20 that is connected at one end to lateral extensions 10e and 10f that extend from the housing arm 10a on opposite sides of the opening 10c. The piston 22 of the motor means 18 abuts a transverse plate 24 which is connected with one end of a bifurcated yoke member 26. At its other end the yoke member includes a pair or radially directed leg portions 26a and 26b that extend between the lateral projections 10e and 10f and are threadably connected with the locking pin 16. A pair of tension springs 28 and 30 are connected at one end with opposite ends of the transverse plate 24 and are connected at their other ends with the leg 10a of the housing 10. Consequently, the tension springs bias the yoke member 26 and the pin 16 to the right toward the locked position illustrated in FIG. 1. Upon the introduction of pressure fluid into the working chamber 18a of the motor means 18 via valve means 31 (FIG. 3) and the opening 18b, the piston 22 is shifted to the left from the FIG. 1 position toward the expanded position of FIG. 2, thereby shifting yoke member 26 and pin 16 to the left against the biasing force of springs 28 and 30, whereby the pin 16 assumes the released position of FIG. 2.

As shown in FIGS. 1 and 2, the adjacent wall surfaces of the housing portions 10a and 10b are tapered in a downwardly convergent manner, and the outer surfaces of the blade member 2 are tapered correspondingly. Furthermore, the locking pin 16 and the locking aperture 2c are correspondingly tapered to achievve a tight locking effect. In order to assure that the blade member 2 is attached to the tilt cab body 4 with proper orientation, the depending blade portion is provided with a lateral orientation projection 2d that extends in a corresponding vertical slot 10g contained in the upper extremity of the housing leg portion 10d as shown in FIG. 1.

As shown in FIG. 3, it will be seen that the lower surface of the depending blade portion 2a is provided with two pairs of orthogonally arranged surfaces 2d and 2e that are adapted for seating engagement with corresponding surfaces 10h and 10i on transverse support portions 10j of the housing member 10. Consequently, when the cab is in the lowered position and the blade member 2 has the seated position relative to the housing 10 shown in FIGS. 1-3, the blade member is rigidly supported against movement in the horizontal direction relative to the housing 10.

Figure 4:
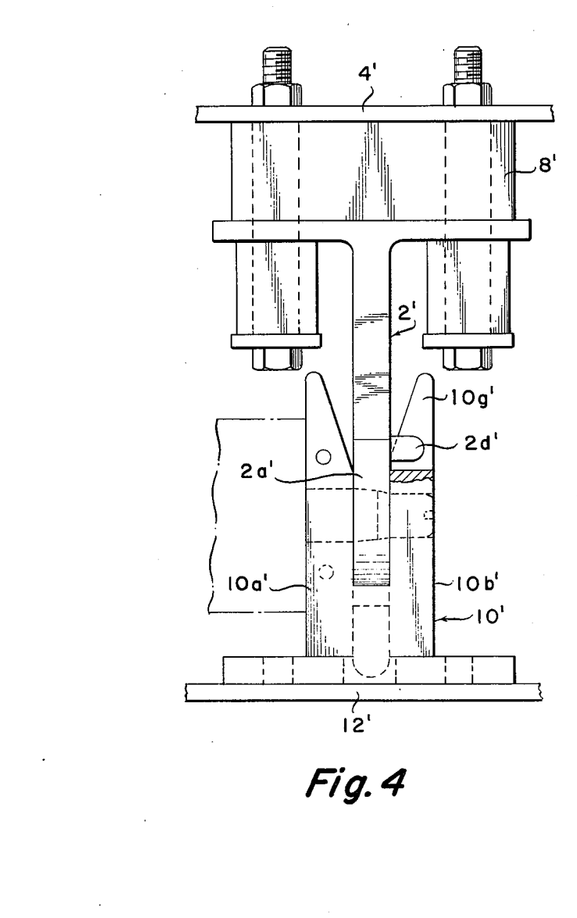
FIG. 4 is a detailed view of an alternate construction wherein the blade and pin housing members have generally parallel walls.

In the modification of FIG. 4, the adjacent wall surfaces of the housing legs 10a' and 10b' and the corresponding outer surfaces of the blade portion 2a' are parallel and straight as distinguished from the tapered downwardly convergent corresponding surfaces of FIGS. 1 and 2.

Figure 5:
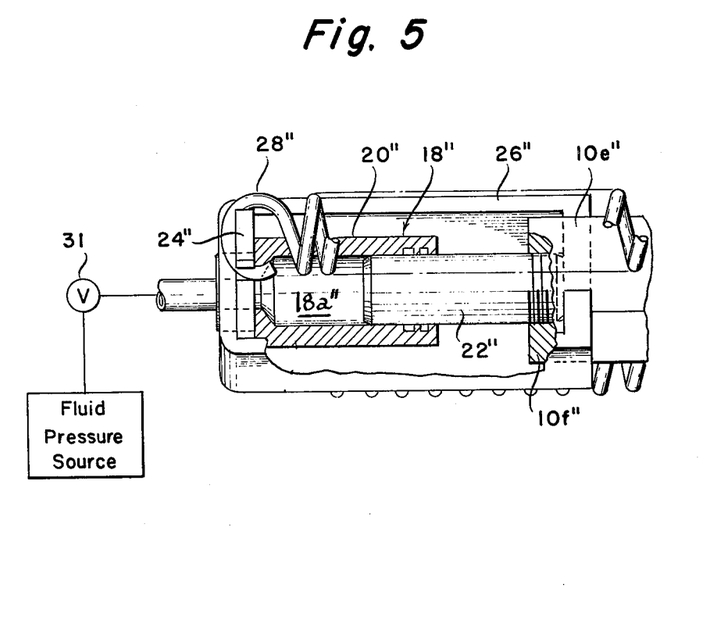
FIG. 5 is a detailed partly sectioned view of an alternate arrangement of the fluid pressure motor operating means of FIG. 1.
Figure 6:
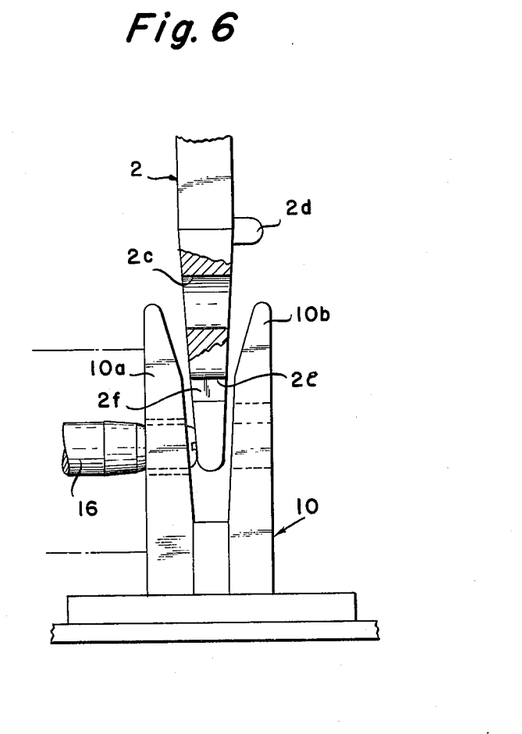
FIG. 6 is a detailed view of the lock assembly when in a jammed condition.

Referring to the modification of FIG. 5, the piston and cylinder elements of the motor means 18'' are reversed, whereby the piston member 22'' is stationary and is connected with the lateral extensions 10e'' and 10f'', and the cylinder 20'' is movable relative to the piston and abuts the transverse plate 24'' for axially shifting the yoke 26'' and the locking pin connected thereto. Referring to FIG. 6, it will be seen that the apparatus of FIGS. 1-3 include a jam-responsive feature. More particularly, the locking aperture 2c is spaced vertically from the lower extremity of the blade member 2, whereby when the blade member is incompletely inserted between the arms 10a and 10b of the housing 10, the lower extremity of the blade member 2 will prevent the locking pin 16 from being erroneously shifted to the right to its locked position.

OPERATION

In operation, when it is desired to displace the locking pin 16 from its locked position of FIG. 1 to its released position of FIG. 2, fluid under pressure is introduced into the working chamber 18a of the motor means 18 via the lateral opening 18b, whereupon the motor means is expanded to shift the yoke member 26 to the left against the biasing force of springs 28 and 30, whereupon the pin 16 assumes the released position of FIG. 2. The tilt cab may then be tilted upwardly to its elevated position, thereby withdrawing the depending portion 2a of the blade member 2 from the space between the arms 10a and 10b of the bifurcated housing 10. The source of pressure fluid may then be disconnected from the working chamber 18a of the motor means 18, whereupon the pin 16 and yoke 26 are shifted to the locked position by the springs 28 and 30. When it is subsequently desired to lower the tilt cab, the working chamber 18a is again pressurized, whereupon the pin 16 is retracted to its released position, whereupon the tilt cab may be lowered to reintroduce the blade depending portion 2a between the arms 10a and 10b of the housing 10. Pressure fluid is then released from the working chamber 18a, whereupon the pin 16 is shifted to the right to extend through the locking aperture 2c and the opening 10d in the housing arm 10b.

Figure 7:
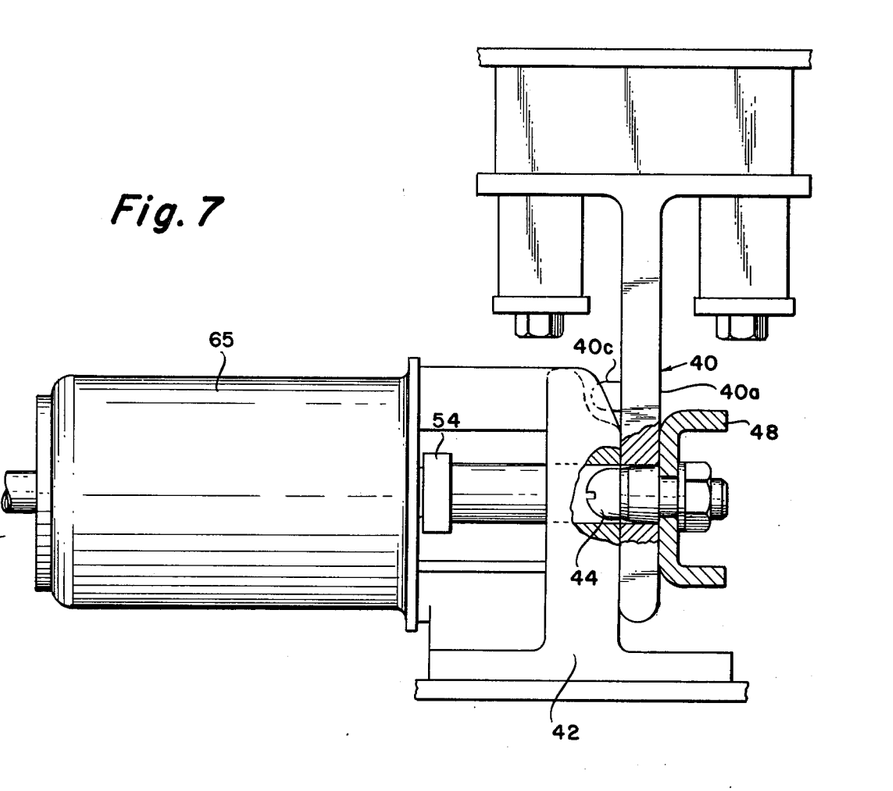
FIG. 7 is a front elevation view of an alternate cab lock means in the locked condition.
Figure 8:
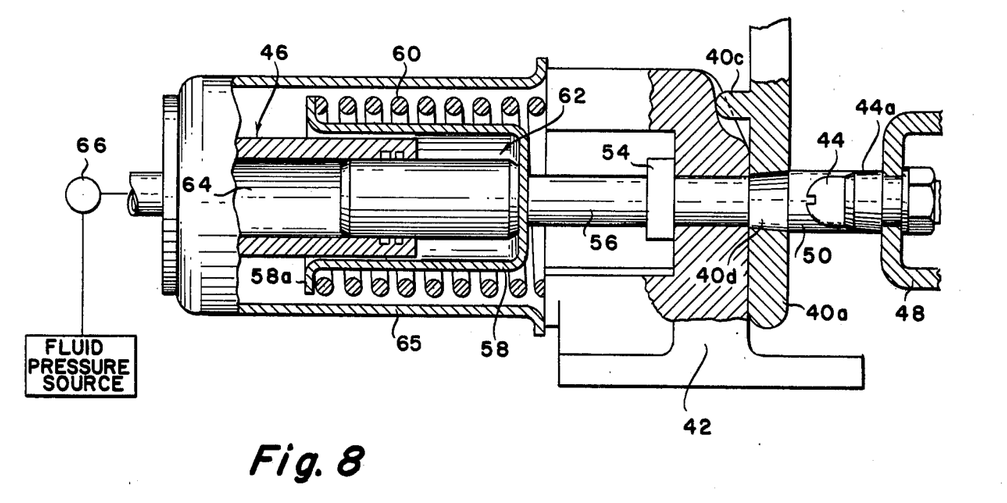
FIG. 8 is a corresponding sectional view of the cab lock means when in the released condition.
Figure 9:
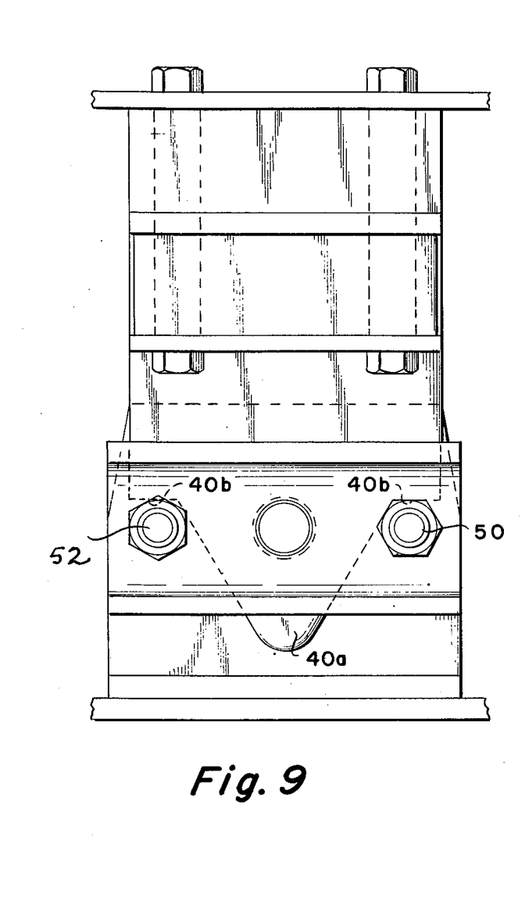
FIG. 9 is a side elevation view of the cab lock means of FIG. 7.

Referring now to the embodiment of FIGS. 7-9, the blade member 40 has a depending portion 40a that is adapted to seat against a side surface of the housing member 42. In this embodiment, the locking pin 44 and the motor means 46 are arranged on opposite sides of the pin housing member. The pin member is connected with a transverse support bar 48 having a U-shaped cross section, said transverse bar being connected for sliding movement relative to the housing member 42 by a pair of longitudinal rods 50 and 52 (FIG. 9) that extend through corresponding openings in the housing member 42 and are connected at their free ends with an actuator cross member 54. As shown in FIG. 8, the actuator cross member 54 is connected with one end of the longitudinally extending actuator shaft 56 the other end of which is connected with the bottom of a cup-shaped drive cap 58. At its open end, the drive cap 58 is provided with an external flange 58a. Compression spring 60 is arranged concentrically about the cap 58 and abuts at opposite ends the external flange portion 58a and the pin housing 42, respectively. Consequently, the compression spring 60 biases the shaft 56, the cross member 54, the rods 50 and 52, the transverse support bar 48 and the locking pin 44 to the left toward the locked position relative to the blade member 40 and the pin housing 42. Arranged concentrically within the cap 58 are piston and cylinder motor means 62, one end of which abuts the bottom portion of the cap 58 and the other end of which engages a cover member 65 that is arranged concentrically about the spring 60 and is secured at one end with the pin housing member 42.

OPERATION

In operation of the embodiments of FIGS. 7-9, when pressure fluid is introduced into the working chamber 64 of the motor means 62 via valve 66, the motor means are expanded to shift the cap 58 to the right against the biasing force of spring 60, thereby displacing the locking pin from its locked position of FIG. 7 toward the released position of FIG. 8. The tilt cab may now be elevated relative to the chassis, thereby raising blade member 40 from the pin member 42. Upon depressurization of the working chamber 64, the spring means 60 return the locking pin to its locked (FIG. 7) position. When it is desired to lower the tilt cab, the working chamber 64 is again pressurized to displace the locking pin to its released (FIG. 8) position, whereupon the tilt cab may be lowered to return the blade member 40 to its seated position relative to the pin housing 42. As shown in FIG. 9, the blade member has a lower portion 40a that depends downwardly between the rods 50 and 52, and horizontal surfaces 40b that are seated on the rods, respectively. Furthermore, as shown in FIGS. 7 and 8, the blade member 40 is provided with a lateral orientation projection 40c that is adapted to extend in a corresponding vertical slot contained in the upper extremity of the pin housing 42, thereby assuring proper orientation of the tapered locking aperture 40d relative to the tapered surface 44a of the locking pin 44.

Figures 10, 11:
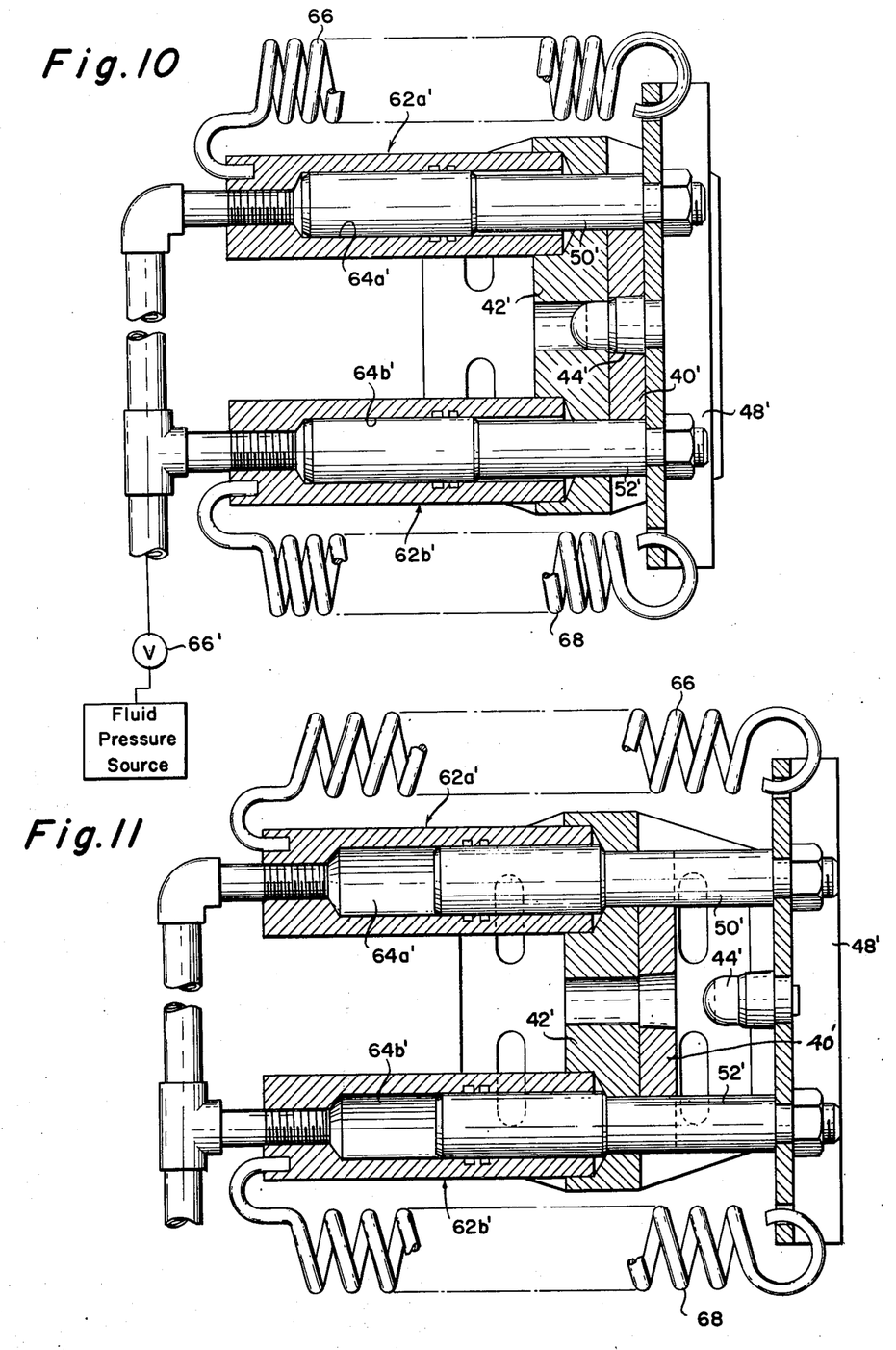
FIG. 10 is a top sectional view of another alternate cab lock means in the locked condition.
FIG. 11 is a corresponding top sectional view of the cab lock means of FIG. 10 in the released condition.
Figure 12:
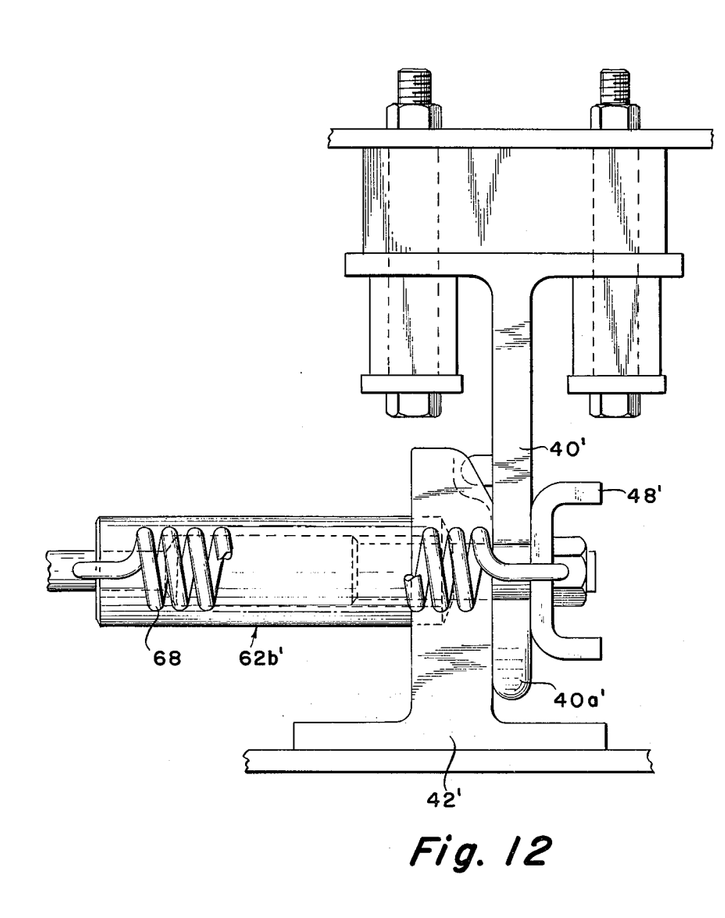
FIG. 12 is a front elevation view of the cab lock means of FIG. 10.

Referring now to FIGS. 10-12, a modification of the embodiment of FIGS. 7-9 is disclosed wherein the ends of the longitudinal rods 50' and 52' are connected with the pistons of a pair of piston and cylinder motor means 62a' and 62b', respectively. The cylinder elements of the motor means 62a' and 62b' are supported at one end by the housing member 42'. A pair of tension springs 66 and 68 are connected at one end with opposite ends of the transverse support bar 48', the other ends of the tension springs being connected with the stationary cylinder elements of the motor means 62a' and 62b', respectively, thereby biasing the transverse support bar 48' and the locking pin 44' toward the locked (FIG. 10) position relative to the blade member 40' and the housing member 42'. Consequently, when the pressure fluid is supplied to working chambers 64a' and 64b' via the valve 66', the motors 62a' and 62b' are expanded to displace the transverse support bar 48' and the locking pin member 44' to the right relative to the blade member 40' and the pin housing member 42' toward the released (FIG. 11) position.

Figure 13:
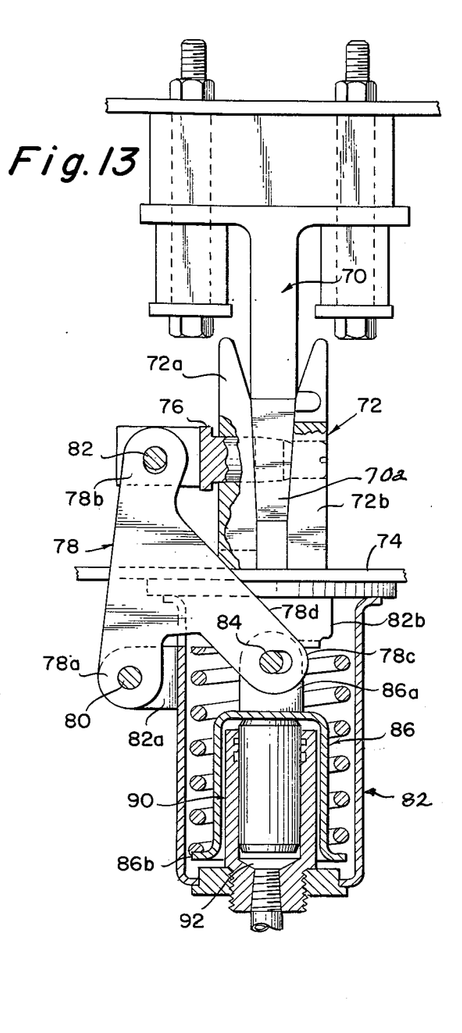
FIG. 13 is a partly sectioned front elevation view of another embodiment of the cab lock means in the locked condition.
Figure 14:
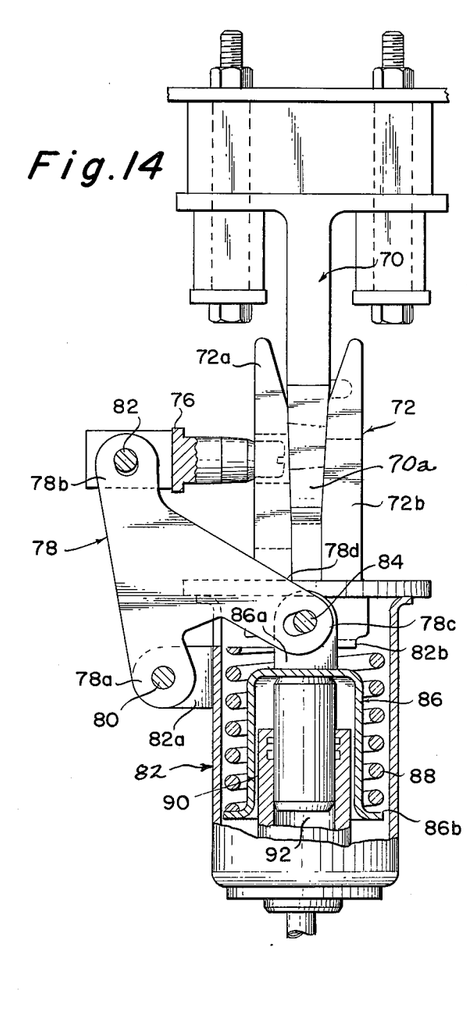
FIG. 14 is a corresponding sectional view of the cab lock means of FIG. 13 in the released condition.
Figure 15:
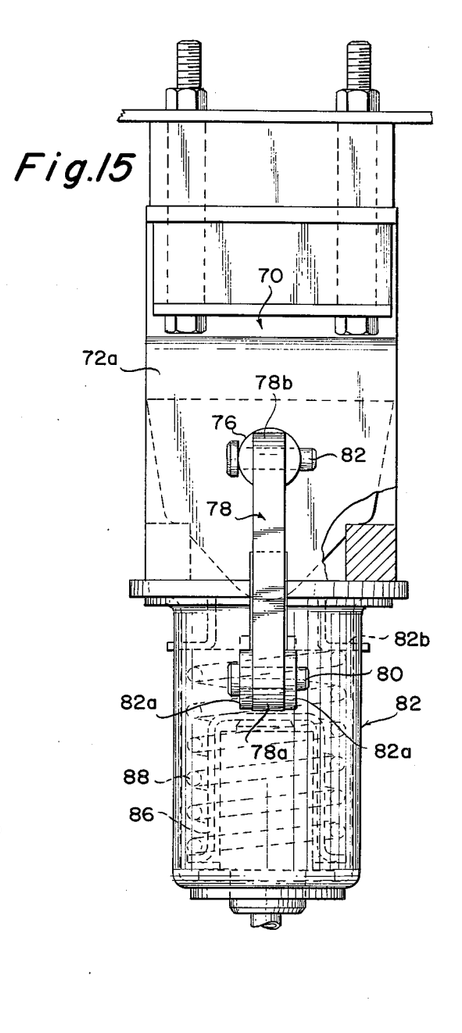
FIG. 15 is a side elevation view of the cab lock means of FIG. 13.

Referring now to FIGS. 13–15, the blade member 70 has a depending portion 70a that is adapted to extend between the arms 72a and 72b of the bifurcated pin housing member 72. The pin housing member is adapted for attachment to the plate portion 74 of the vehicle chassis. The locking pin 76 is operated by a bell crank member 78 having three arm portions 78a, 78b and 78c. The bell crank member, which extends through a corresponding opening contained in the chassis plate portion 74, is pivotally connected with a pivot 80 that is carried by lateral extensions 82a of a cover member 82 that is connected at its upper end with the bottom of the chassis plate portion 74. A second pivot 82 pivotally connects the bell crank arm 78b with the locking pin member 76, and a third pivot 84 connects the third bell crank arm 78c with vertical extensions 86a that extend upwardly from the bottom portion of a cup-shaped cup 86. A compression spring 88 mounted concentrically about the cap 86 between an external flange portion 86b on the cap and spacer means 82b (FIG. 15) on the upper end of the cover 82 bias the cap 86 downwardly and pivot the bell crank 78 in the clockwise direction about pivot 80 to displace the locking pin 78 toward its locked (FIG. 13) position. Piston and cylinder motor means 90 are arranged longitudinally within the cap member 86 between the bottom portion thereof and the lower end of the cover member 82.

OPERATION

In operation, assuming that the locking means is in the locked (FIG. 13) position, introduction of pressure fluid into the working chamber 92 of the motor means 90 causes expansion thereof to initiate elevation of the cap member 86 against the biasing force of spring 88, whereby bell crank member 78 is pivoted in the counterclockwise direction about fixed pivot 80. As locking pin 76 is displaced toward the released (FIG. 14) position, the upper surface 78d of the bell crank arm 78c engages the lowermost extremity of the downwardly depending portion 70a of blade member 70 as shown in FIG. 14, thereby assisting in initiating release of the blade member 70 from its seated position relative to the arms 72a and 72b of the bifurcated pin housing 72. The tilt cab may then be elevated relative to the chassis 74, whereby upon depressurization of the working chamber 72, spring 88 returns the locking pin member 76 toward its locked (FIG. 13) position. To lower the tilt cab relative to the chassis, working chamber 92 is again pressurized to shift locking pin member 76 to its released position, and after the blade member 70 has returned to its fully seated position of FIG. 13, the working chamber 92 is again depressurized, and spring 88 returns the locking pin 76 to its locked position.

Figure 16:
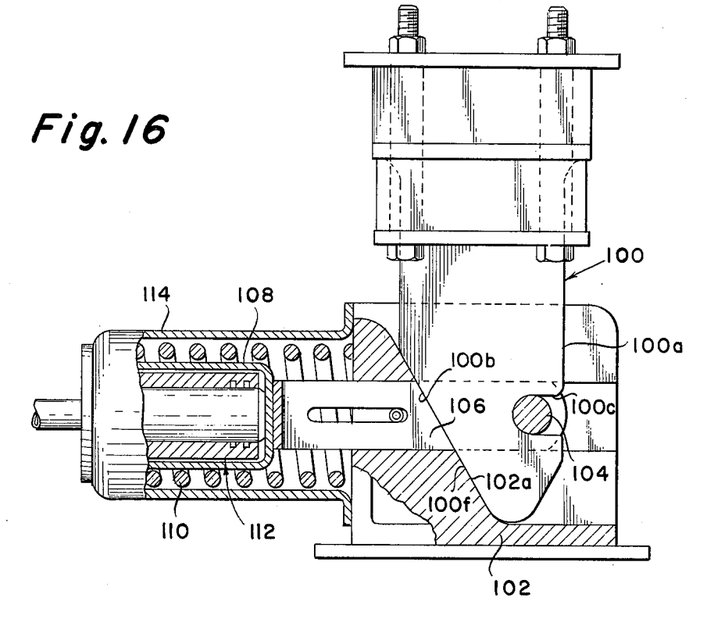
FIG. 16 is a front elevation sectional view of another alternate cab lock means shown in the locked condition.
Figure 17:
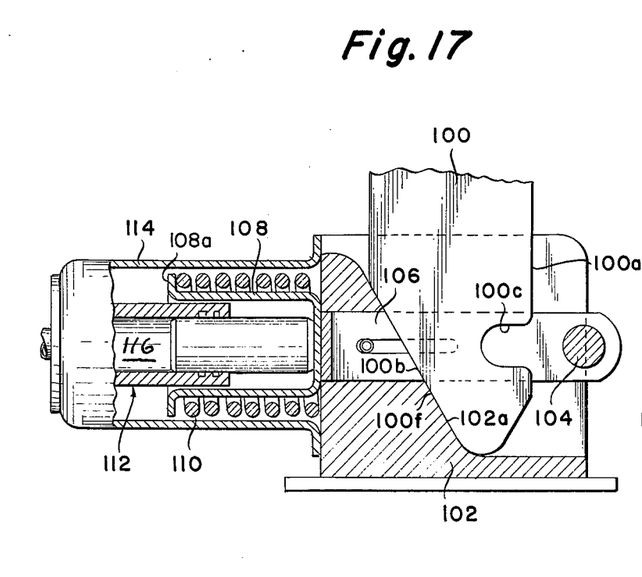
FIG. 17 is a corresponding sectional view showing the cab lock means in the released condition.
Figure 18:
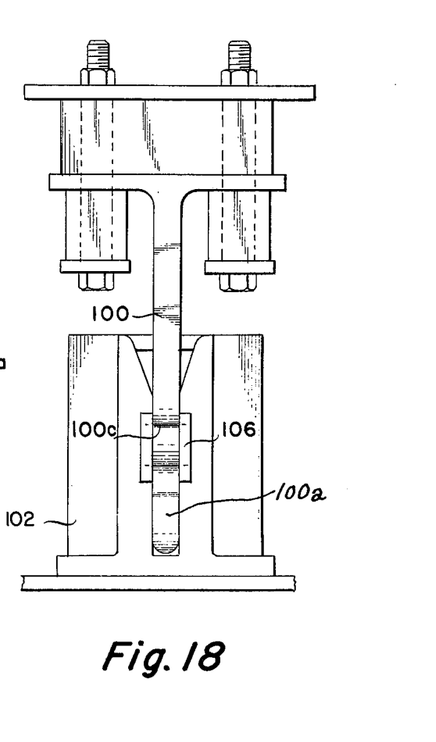
FIG. 18 is a side elevation view of the cab lock means of FIG. 16.

Referring now to FIGS. 16–18, the depending portion 100a of the blade member 100 has at one end a tapered surface 100b that is adapted for seating engagement with a corresponding tapered surface 102a of the pin housing member 102. The other end surface of the depending portion 100a contains a horizontal slot 100c that is adapted to receive the transverse locking pin member 104. The locking pin member 104 extends transversely between the arms of clevis means 106 that extend within corresponding openings contained in the housing member 102. At its end remote from the locking pin 104, the clevis means 106 is connected with the bottom portion of a cup-shaped cap member 108 having at its open end an external flange portion 108a (FIG. 17). Compression spring 110 mounted concentrically about the cap member 108 between the external flange portion 108a thereof and the pin housing 102 bias clevis means 106 and locking pin 104 to the left toward the locked (FIG. 16) position. Arranged longitudinally within the cup-shaped member 108 are piston and cylinder motor means 112, one element of which abuts the bottom portion of the cap 108 and the other element of which is connected with a cover member 114 that is arranged concentrically about the spring 110 and is connected at its open end with the pin housing 102.

OPERATION

In operation, when pressure fluid is admitted to the working chamber 116 of motor means 112, the piston element thereof is shifted to the right to displace cap 108, clevis means 106 and locking pin 104 to the right toward the released (FIG. 17) position against the biasing force of spring 110. The tilt cab may now be elevated relative to the chassis, thereby to raise blade member 100 relative to the pin housing 102. Upon depressurization of the working chamber 116, the spring means 110 returns the locking pin 104 to its locked position. To lower the tilt cab, the working chamber 116 is again pressurized to shift locking pin 104 to its released (FIG. 17) position, whereupon the tilt cab may be lowered to again seat the blade member 100 upon the tapered surface 102a of the pin housing member 102.

Figure 19:
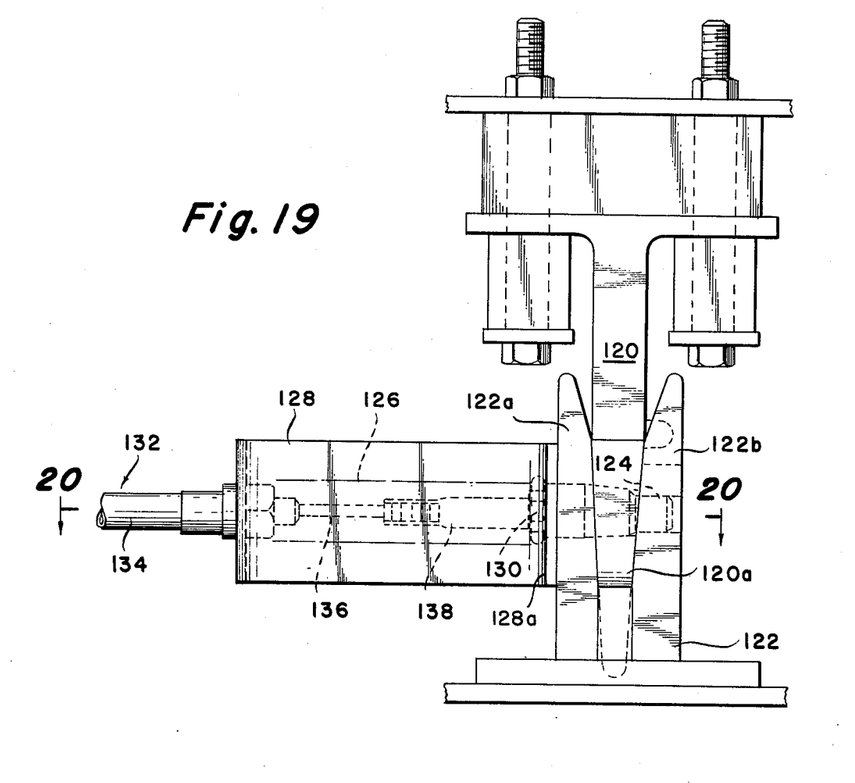
FIG. 19 is a front elevation of an alternative embodiment illustrating a locking mechanism similar to that of FIG. 1 utilizing a manual release actuator, shown in the locked condition, adapted for remote attachment of the actuating lever (not shown)
Figure 20:
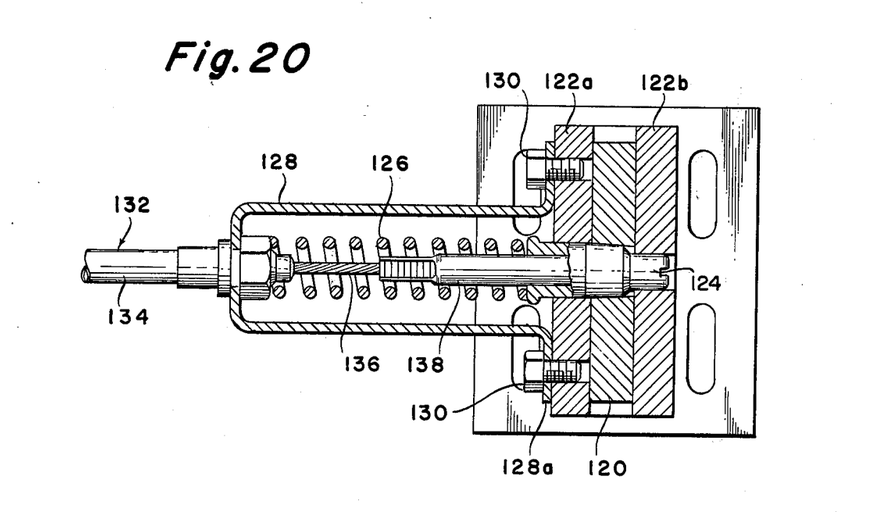
FIG. 20 is a top sectional view of the locking mechanism relative to FIG. 19 taken along the line 20—20 of FIG. 19 with the pin in the locked condition.
Figure 21:
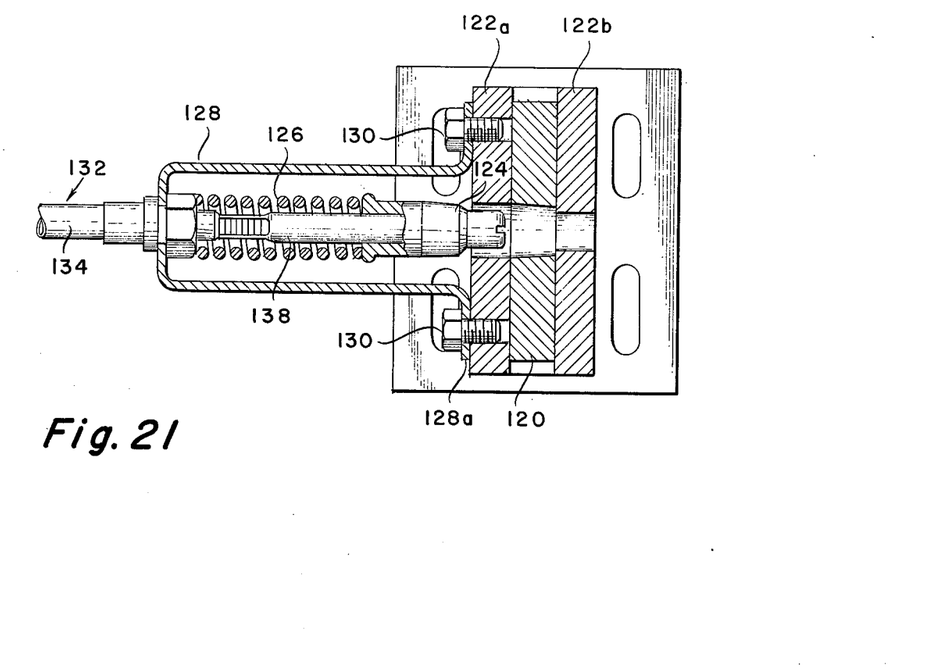
FIG. 21 is a corresponding top sectional view of the locking mechanism of FIG. 19 with the pin in the released condition.

Referring now to the embodiment of FIGS. 19–21, the blade member 120 again has a lower portion 120a that is adapted to extend in seated engagement between the arms 122a and 122b of a pin housing 122. As shown in FIG. 20, the locking pin 124 is normally biased to the right toward the locked position by compression spring 126 which is in abutment at opposite ends with the locking pin member 124 and a cover member 128, respectively. At its right hand end, the cover member 128 has an external flange portion 128a that is bolted to the pin housing 122 by means of bolts 130. Actuator means 132 are provided which comprise a coaxial cable having an outer sheath member 134 which is rigidly connected at one end with an aperture contained in the bottom portion of the cup-shaped cover member 128. The coaxial cable means 132 includes an inner strand member 136 that is axially displaceable relative to the sheath 134, said inner strand member 136 being connected at one end with the adjacent end of a strand end fitting 138. The other end of the strand fitting 138 is threadably connected with the locking pin 124.

OPERATION

In operation of the embodiments of FIGS. 19–21, in order to shift locking pin member 124 from its locked (FIG. 20) position toward its released (FIG. 21) position, the inner strand member 136 is withdrawn into the outer sheath 134 against the biasing force of compression spring 126. The tilt cab may then be elevated to raise the blade member 120 from the pin housing 122. Upon release of tension on the inner strand member 136, the spring 126 biases the locking pin 134 toward its locked position. To again lower the tilt cab, the locking pin 124 is retracted, whereupon the blade member 120 may be lowered between the arm portions 122a and 122b of the bifurcated pin housing 122, and upon release of tension on the inner strand member 136, the spring 126 returns the locking pin to its locked (FIG. 20) position.

Figure 22:
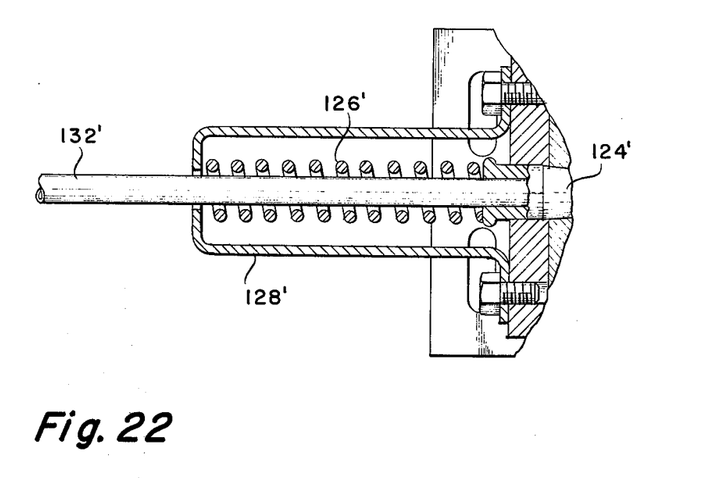
FIG. 22 is a partial top sectional view of a modification of the locking mechanism of FIG. 19–21 including a longitudinally arranged rod actuator.
Figure 23:
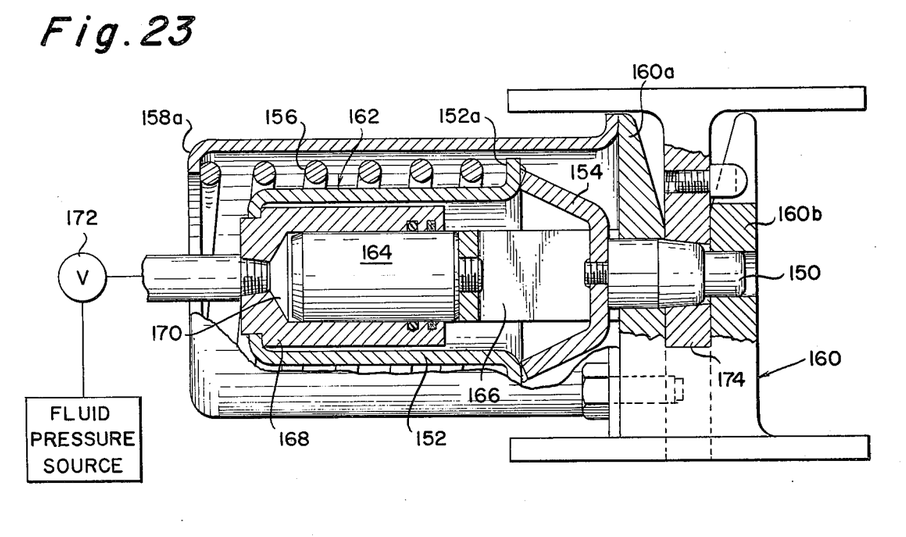
FIG. 23 and 24 are partially sectioned side and top elevational views, respectively, of a further embodiment of the invention, when in the locked condition.
Figure 24:
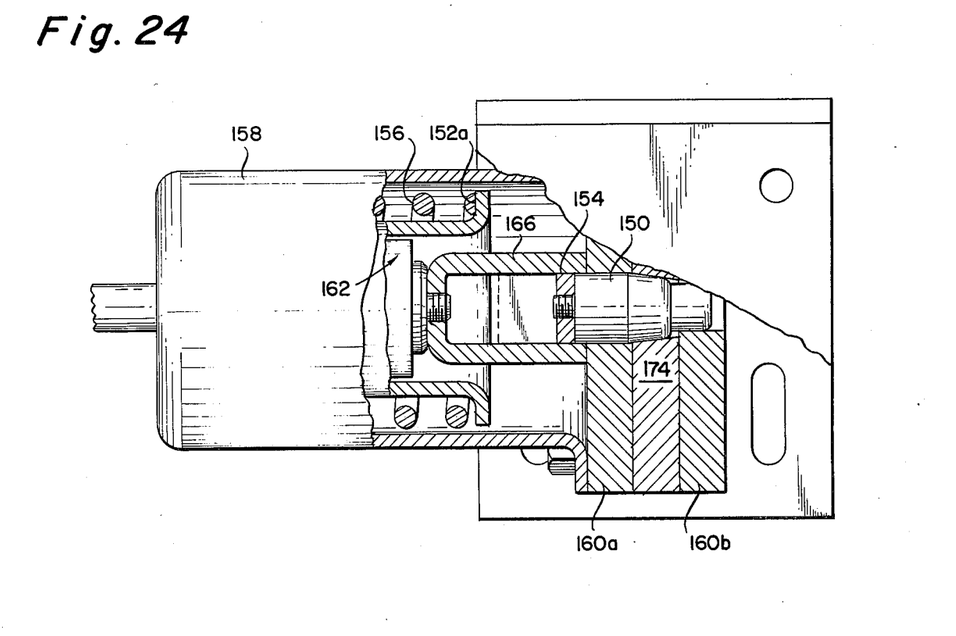
Figure 25:
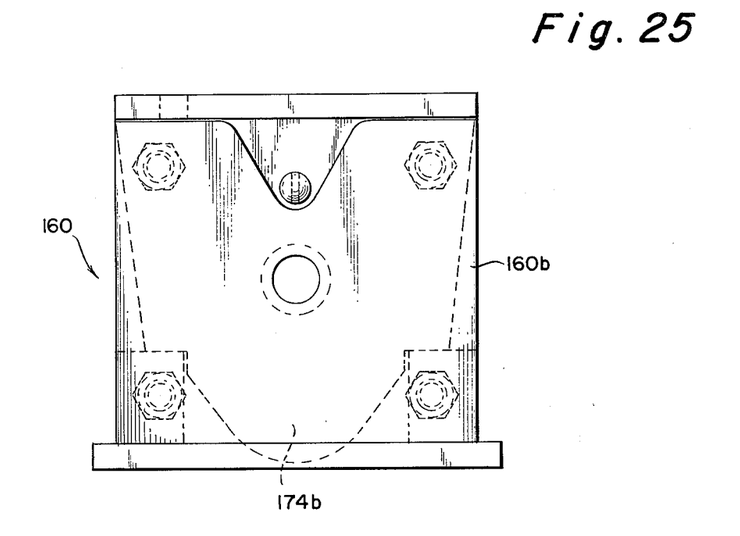
FIG. 25 is an end view of the apparatus of FIG. 25.

Referring to the modification of FIG. 22, the actuator means 132' comprises a rod that extends through the aperture in the end of the cover member 128' and it threadably connected directly with the locking pin member 124'. Compression spring 126' biases the acutator 132' and the locking pin 124' toward the locked (FIG. 22) position.

Referring now to the embodiment of FIGS. 23–26, the locking pin 150 is connected with the actuator drive cap 152 via a U-shaped yoke member 154. A compression spring 156 arranged concentrically about the actuator drive cap is compressed between the drive cap external flange 152a and the end wall 158a of a hollow spring cover member 158 the open end of which is secured to leg 160a of the pin housing member 160, thereby biasing the locking pin toward the locked position of FIG. 23. Mounted concentrically within the actuator drive cap 152 is a piston-cylinder motor 162 the piston 164 of which is rigidly connected with a U-shaped yoke member 166 which abuts against the pin housing member 160. The yoke members 154 and 166 face each other and are orthogonally arranged, the base portion of one yoke member being received between the legs of the other yoke member. The movable cylinder 168 of the motor 162 is connected at its left hand end with the corresponding end wall of actuator drive cap 152, whereby upon the introduction of pressure fluid into the working chamber 170 of the motor 162 via control valve 172, the cylinder 168 is shifted to the left against the force of spring 156 to displace locking pin 150 to the released condition of FIG. 26 relative to the blade member 174.

OPERATION

Figure 26:
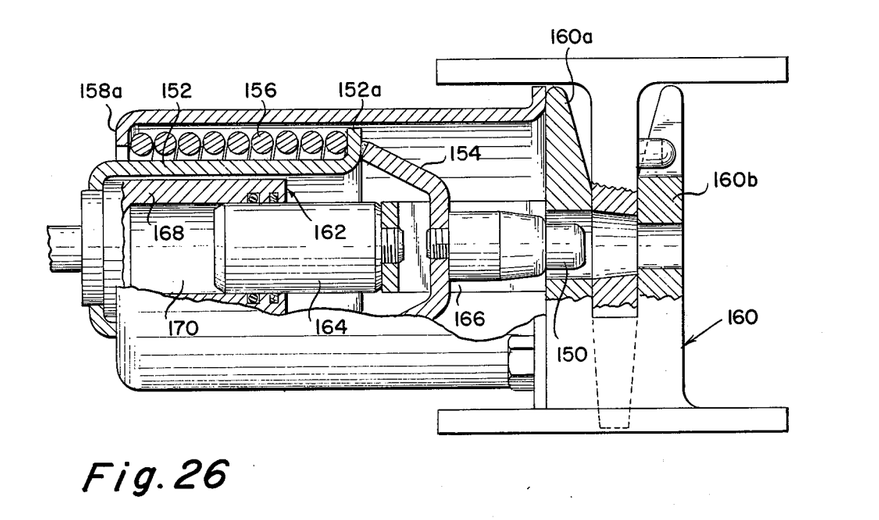
FIG. 26 is a partially sectioned view of the apparatus of FIG. 23 when in the released condition.

Regarding the operation of the embodiment of FIGS. 23–26, when the locking means is in the locked (FIG. 23) condition, introduction of pressure fluid into the working chamber 170 causes expansion of the motor to shift to the left toward the released position of FIG. 26 the cylinder 168, the actuator drive cap 152, the yoke 154 and the locking pin 150. The tilt cab may now be tilted upwardly toward its elevated position, thereby permitting withdrawal of the blade member 174 from the pin housing member. When the pressure of fluid in working chamber 170 is reduced, the locking pin is shifted to the right by the biasing force of spring 156. When it is subsequently desired to lower the tilt cab, the working chamber 170 is again pressurized to shift locking pin 150 toward the released condition, whereupon the tilt cab may be lowered to introduce the blade member into the pin housing member. Upon reduction of pressure of chamber 170, the locking pin is again shifted to the right toward the locked position.

While the locking means of the instant invention have been disclosed for locking together the cab and chassis components of a tilt cab vehicle, it is apparent that the invention has utility in other applications, such as the locking together of the components of tailgates, vehicle aerial buckets, vehicle booms, crane and scraper turntables, tilt bed truck and trailer beds, the latching of implements to tractors, and pintel hook locking means, for example.

While in accordance with the provisions of the Patent Statutes the preferred embodiments and modifications of the invention have been illustrated and described, it will be apparent to those skilled in the art that other modifications may be made in the apparatus described without deviating from the inventive concepts.

What is claimed is:

1. A locking assembly for locking together a pair of components which are displaceable between first and second positions in which said components are adjacent and spaced from each other, respectively, comprising a. a housing member adapted for connection with one of said components adjacent the other of said components;
   b. a blade member adapted for connection at one end with the other of said components opposite said housing, the other end of said blade member extending toward and being in engagement with said housing member when said components are in the first position, one of said housing and blade members containing a locking opening;
   c. a locking pin connected with the other of said members for movement between locked and released positions relative to said locking opening; and
   d. actuator means for displacing said locking pin between its locked and released positions, respectively, said actuator means including spring means biassing said locking pin in the locking direction relative to said locking opening, said actuator means further including a hollow open-ended cover member the open end of which is connected with said housing member concentrically about said locking pin, an open-ended actuator cap arranged in said cover member with the open end of said cap facing and spaced from said locking pin, said cap having at its open end an external flange, and a first yoke member connecting the open end of said cap with said locking pin, said spring means comprising a compression spring arranged concentrically about said cap between said external flange and an end wall portion of said cover member at the end thereof remote from said open end.

2. Apparatus as defined in claim 1, wherein said actuator means further includes piston and cylinder motor means arranged concentrically within said cap, one of the piston and cylinder elements of said motor means being connected with the end wall of said cap remote from the end wall thereof, and a second yoke member connecting the other element of said motor means with said housing means, whereby upon the introduction of pressure fluid within the working chamber of said motor means, said cap and said first yoke member are displaced against the biasing force of said spring to displace the locking pin toward its released position.

3. Apparatus as defined in claim 2, wherein said first and second yoke members comprise orthogonally arranged U-shaped members each having base and leg portions, said yoke members facing each other with the base portion of each yoke member being contained between the leg portions of the other yoke member.

* * * * *